(12) United States Patent
Ickman et al.

(10) Patent No.: US 8,438,165 B2
(45) Date of Patent: May 7, 2013

(54) INTEREST TRACKING USING SHARED SEARCH QUERIES AND INTERACTIONS

(75) Inventors: Steven Ickman, Snoqualmie, WA (US); Thomas Matthew Laird-McConnell, Kirkland, WA (US); William Lawrence Portnoy, Woodinville, WA (US); Christopher McConnell, Redmond, WA (US); Lili Cheng, Bellevue, WA (US); David Arthur Raskino, Kirkland, WA (US); Gregory Scott Melander, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 13/105,920

(22) Filed: May 12, 2011

(65) Prior Publication Data
US 2012/0290603 A1  Nov. 15, 2012

(51) Int. Cl.
*G06F 7/02* (2006.01)
*G06F 17/30* (2006.01)

(52) U.S. Cl.
USPC ........... 707/738; 707/754; 707/769; 707/713; 707/722

(58) Field of Classification Search ........... 707/999.003, 707/999.102, 999.107, 713, 769
See application file for complete search history.

(56) References Cited

U.S. PATENT DOCUMENTS

| | | | |
|---|---|---|---|
| 6,484,162 B1 | 11/2002 | Edlund et al. | |
| 7,725,526 B1 | 5/2010 | Kraft | |
| 7,831,684 B1 | 11/2010 | Lawler et al. | |
| 2005/0071328 A1 | 3/2005 | Lawrence | |
| 2006/0253459 A1 | 11/2006 | Kahn et al. | |
| 2007/0203906 A1 | 8/2007 | Cone et al. | |
| 2008/0126476 A1* | 5/2008 | Nicholas et al. | 709/203 |
| 2009/0282023 A1 | 11/2009 | Bennett | |
| 2010/0058202 A1* | 3/2010 | Rostom | 715/758 |
| 2010/0205541 A1 | 8/2010 | Rapport et al. | |
| 2010/0235354 A1 | 9/2010 | Gargaro et al. | |
| 2011/0270678 A1* | 11/2011 | Drummond et al. | 705/14.52 |
| 2011/0276921 A1* | 11/2011 | Long | 715/825 |
| 2012/0005224 A1 | 1/2012 | Ahrens et al. | |
| 2012/0150598 A1 | 6/2012 | Griggs | |

OTHER PUBLICATIONS

"Features:Google Social Search", Retrieved at <<http://www.google.com/support/websearch/bin/answer.py?answer=165228>>, Retrieved Date: Mar. 11, 2011, p. 1.

Capra, et al., "Classifications of Collaborative Search", Retrieved at <<http://workshops.fxpal.com/cscw2010cis/submissions/tmp12.pdf>>, Retrieved Date: Mar. 11, 2011, pp. 3.

(Continued)

*Primary Examiner* — Bruce Moser
(74) *Attorney, Agent, or Firm* — Joseph R. Kelly; Westman, Champlin & Kelly, P.A.

(57) ABSTRACT

When a user enters an information retrieval query, topic feed is generated for publication or distribution to a set of followers or recipients who have elected to receive the topic feed from the user or based on the subject matter content of the query. The topic feed is distributed and includes the query. The user's interests are tracked based on text in the user's queries and other text in the topic feed that the user interacts with.

15 Claims, 18 Drawing Sheets

OTHER PUBLICATIONS

Setten, et al., "Collaborative Search and Retrieval: Finding Information Together", Retrieved at <<https://doc.telin.nl/dsweb/Get/Document-8269/GigaCE-Collaborative_Search_and_Retrieval_Finding_Information_Together.pdf>>, Retrieved Date: March 11, 2011, pp. 6.

U.S. Appl. No. 13/152,319 Application and drawings.

U.S. Appl. No. 13/105,914 Application and drawings.

U.S. Appl. No. 13/152,319 Office Action dated Jan. 16, 2013, 12 pages.

U.S. Appl. No. 13/105,914 Office Action dated Feb. 25, 2013. 18 pages.

\* cited by examiner

INTEREST TRACKING USING SHARED SEARCH QUERIES AND INTERACTIONS

BACKGROUND

Social network sites are currently popular. Many social network sites basically attempt to capture a social graph of connections among users. The users are often family members, classmates, and other prior acquaintances.

Current information retrieval systems allow individual users to employ search engines to explore various areas of knowledge stored in a data corpus, or a variety of different corpora, and accessible either directly, over a network. For instance, some information retrieval search engines allow a user to submit a query to search for information over a wide area network, such as the Internet. Conventionally, a user may submit queries that represent topics of interest to that user.

Searches using these conventional types of search engines are private, in that the originator of the query, and in fact the queries themselves along with their search results, are not automatically shared with anyone else. If the user does wish to share this type of information, it is currently done by a manual, user-initiated, process which can be fairly cumbersome and error prone.

The discussion above is merely provided for general background information and is not intended to be used as an aid in determining the scope of the claimed subject matter.

SUMMARY

Current social network sites encounter problems in allowing users to learn more about (and construct deeper relationships based on) shared interests with other people. Because information retrieval search systems are often used by users to search for information which is of interest to them, the searches, and the results that those users selected in response to the searches, often yield a great deal of knowledge about the current interests of the individuals using the information retrieval system. By making the information retrieval process public, so that it can be followed by others, an interest graph can be captured that allows people to learn more about shared interests with other people.

Therefore, when a user enters an information retrieval query, a topic feed generator automatically generates a topic feed for publication or distribution to a set of followers or recipients who have elected to receive the topic feed from either the user or based on the subject matter content of the query. A feed distributor component automatically distributes the topic feed, which includes the query, to the identified recipients. The user's interests are tracked based on the user's queries and other text in the topic feed that the user interacts with.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

General Operation

Figure 1:
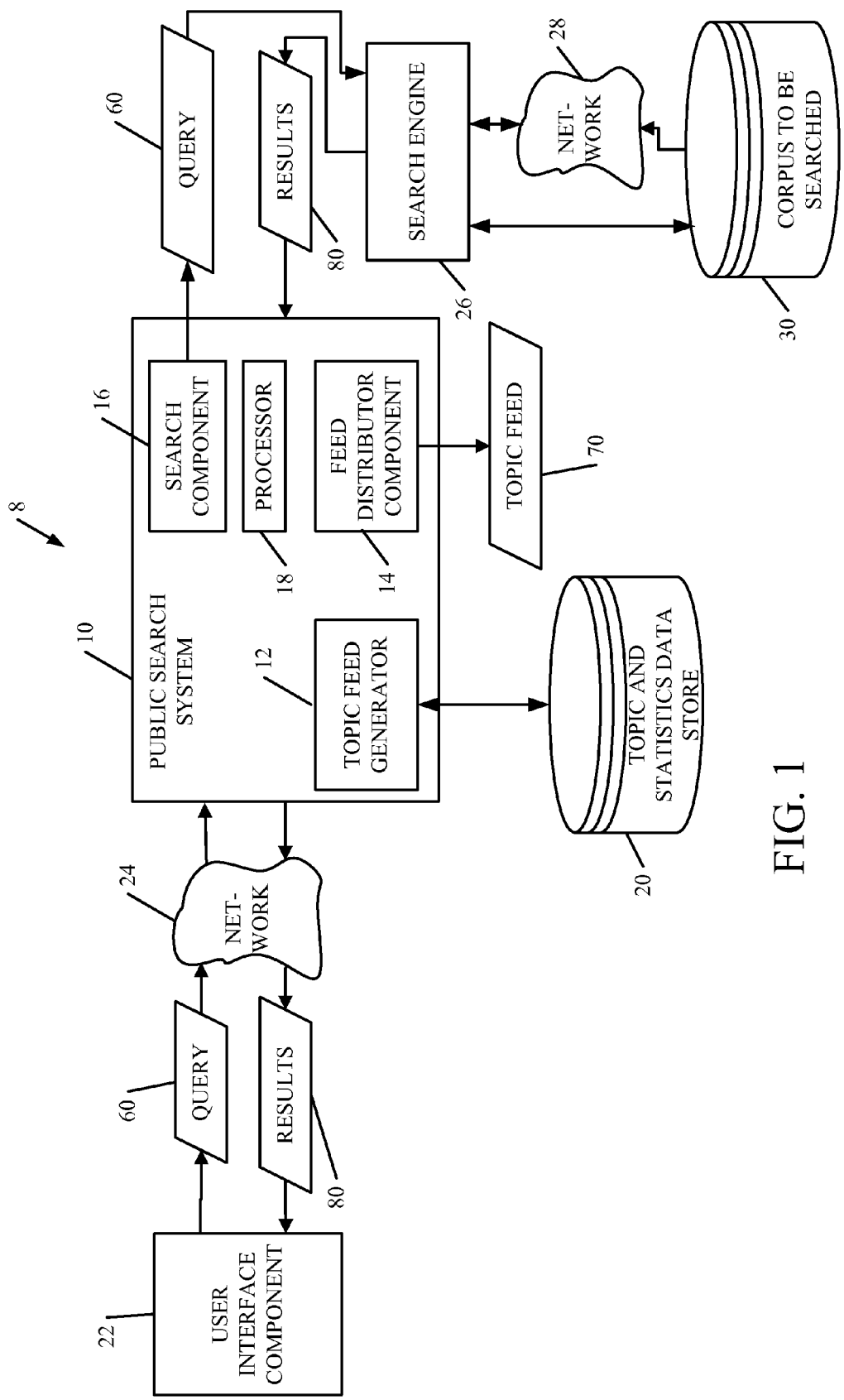
FIG. 1 is a simplified block diagram of a public search system, in accordance with one embodiment.

FIG. 1 is a simplified block diagram of one embodiment of a social network 8 that includes public search system 10. Public search system 10 illustratively includes topic feed generator 12, feed distributor component 14, search component 16 and processor 18. Public search system 10 is also shown connected to a topic and statistics data store 20. In the embodiment shown in FIG. 1, public search system 10 is also illustratively connected to user interface component 22 which resides on a client device. The client device can be any suitable computing device, such as a laptop computer, a cellular telephone, any other type of personal digital assistant (PDA), other mobile device, or other computing device (such as a desktop computer).

In the embodiment shown in FIG. 1, public search system 10 is shown connected to user interface component 22 through network 24. Network 24 can be a local area network, a wide-area network (such as the Internet) or any other desired network. Of course, user interface component 22 could also be directly connected to, or reside on, public search system 10. FIG. 1 also shows that public search system 10 is connected to search engine 26 which, itself, is connected either through a network 28, or directly, to a corpus 30 that is to be searched.

It will be appreciated that the block diagram shown in FIG. 1 is exemplary only. The functions associated with the elements to be described can be combined into a single component, or further divided into more discrete components. Similarly, the connections shown in FIG. 1 can be through networks, or direct connections, and those shown are for exemplary purposes only.

Figure 2:
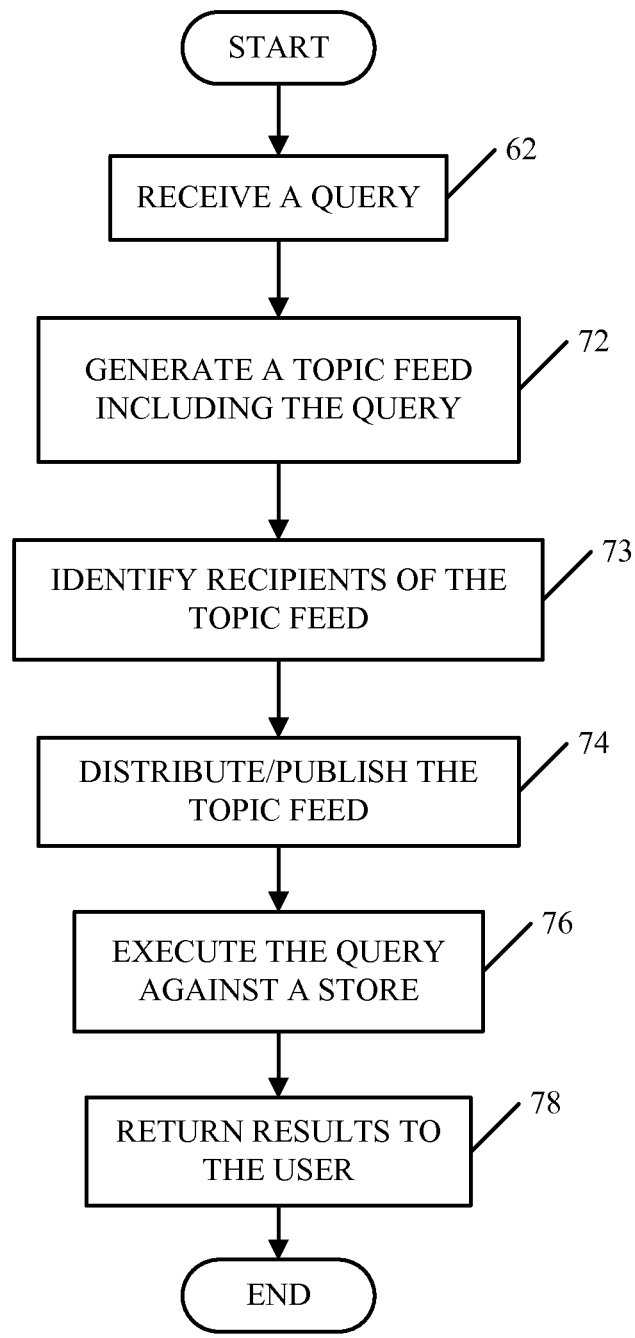
FIG. 2 is a simplified flow diagram illustrating one embodiment of the operation of the system shown in FIG. 1.
Figure 3A:
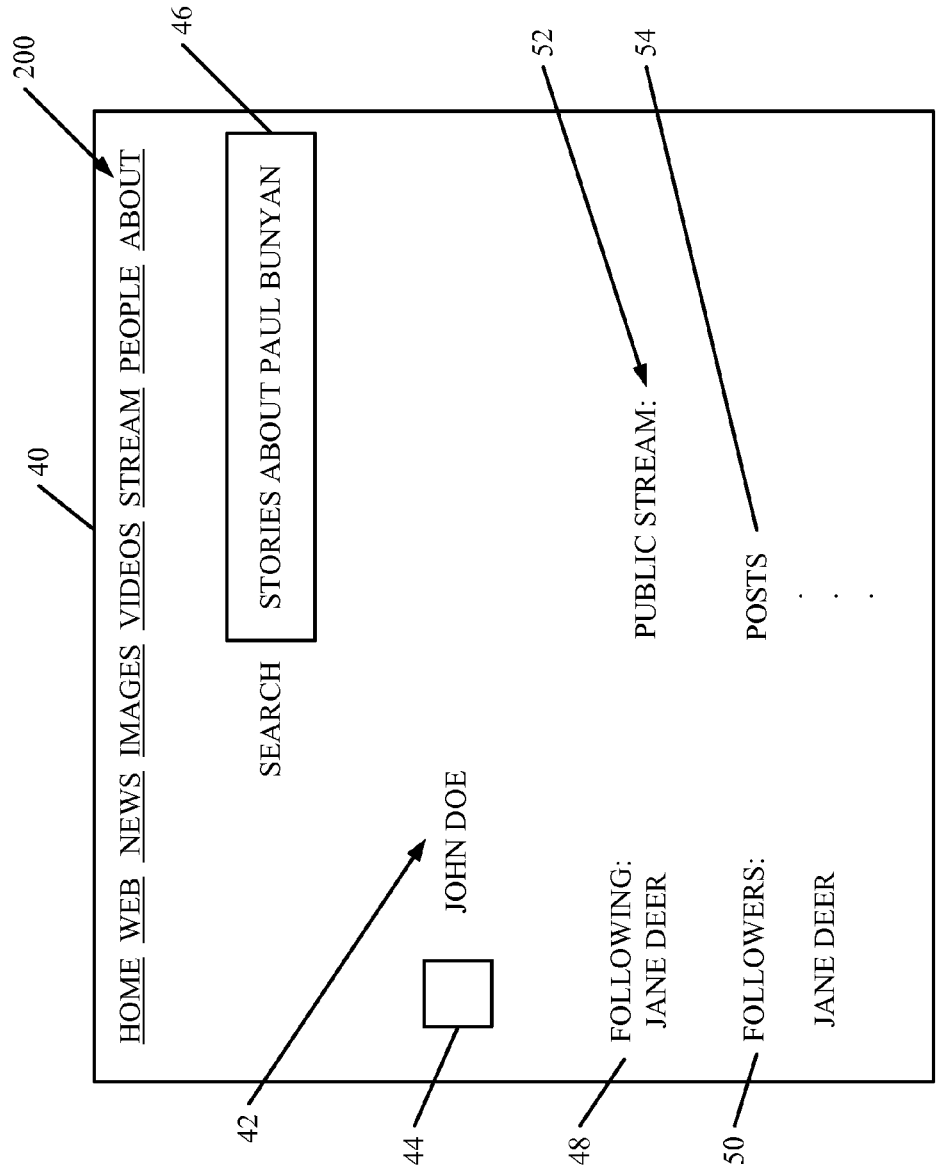
FIGS. 3A-3C are exemplary embodiments of user interface displays.
Figure 3B:
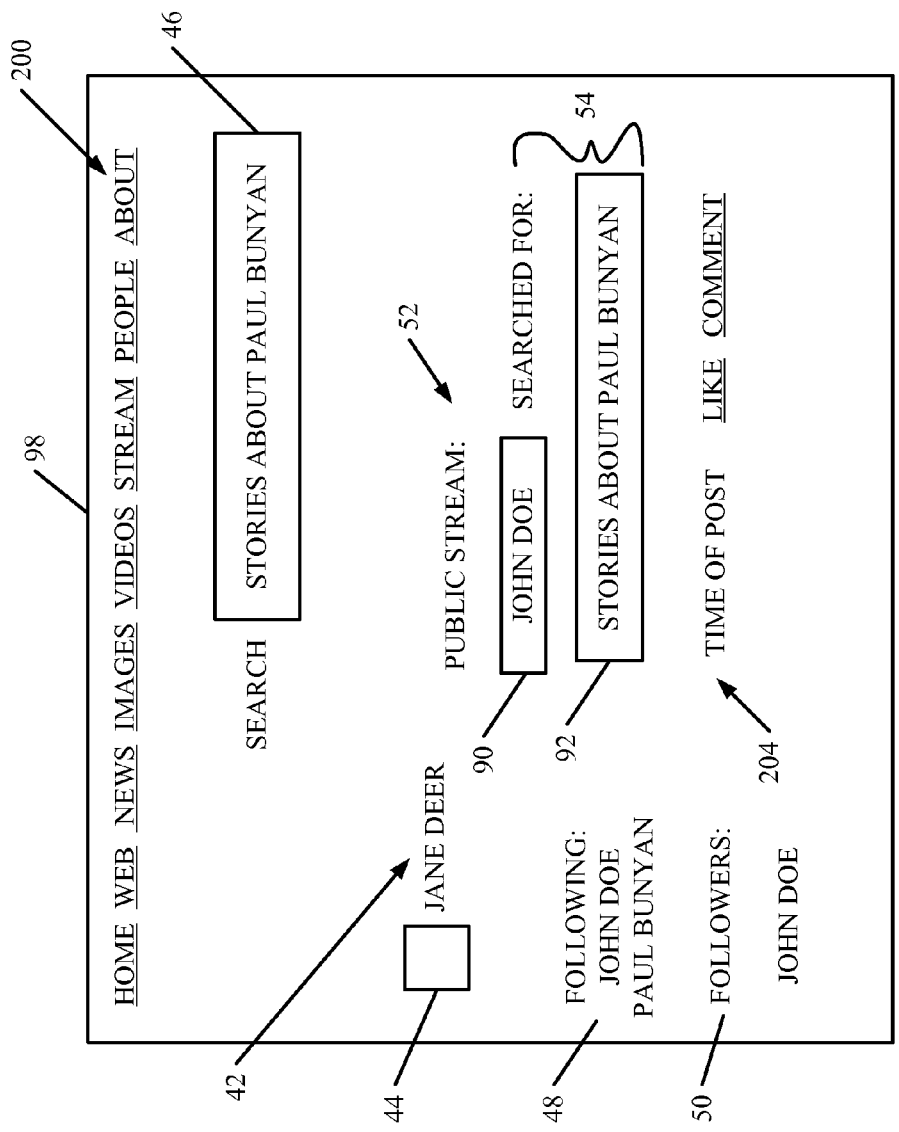
Figure 3C:
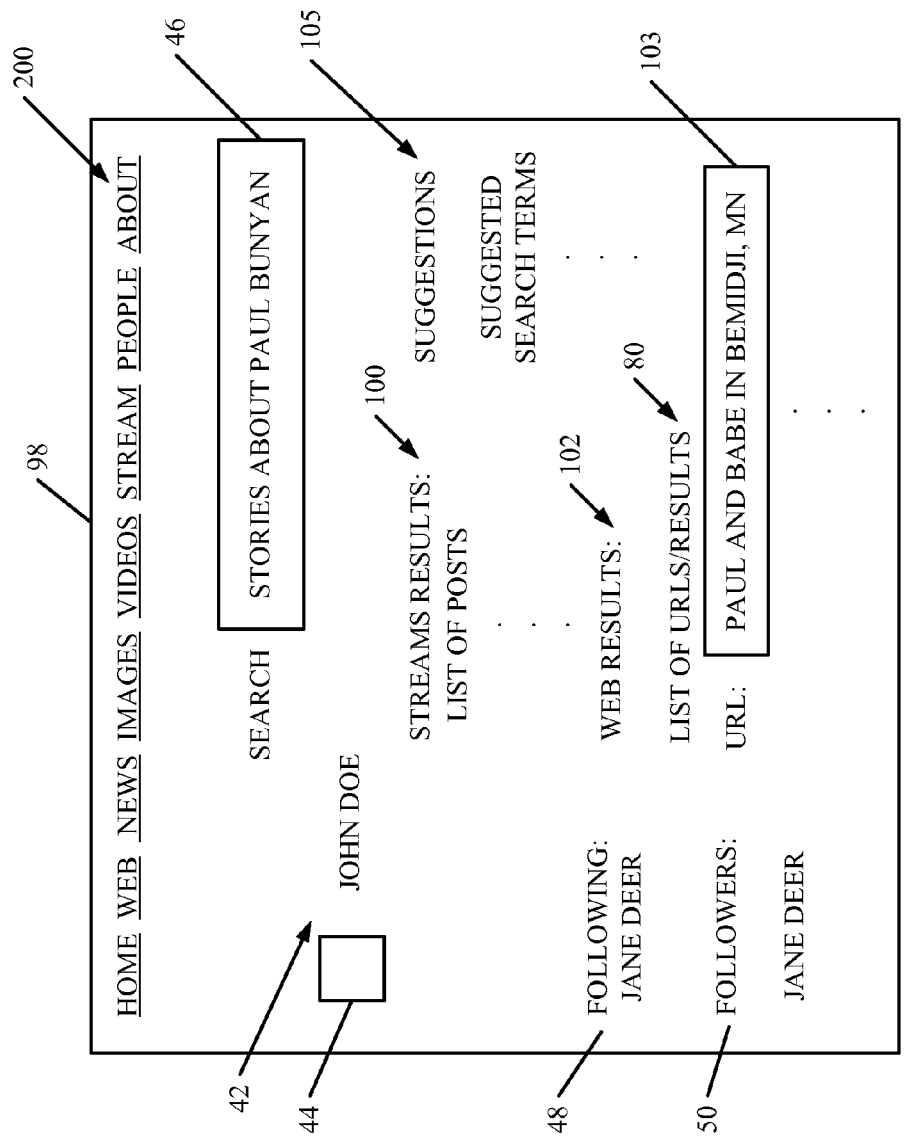

FIG. 2 is a simplified flow diagram illustrating one embodiment of the operation of social network 8 shown in FIG. 1. FIGS. 3A-3C show illustrative user interface displays corresponding to the operation of the system described with respect to FIG. 2. FIGS. 1-3C will be described in conjunction with one another.

User interface component 22 illustratively resides on a user's system, which may be a client device. In one embodiment, in order to use system 8, a user first engages user interface component 22 to set up an account which includes, for example, a user name and password. The user inputs these items through interface component 22, and they are stored in topic and statistics data store 20. The user is illustratively able to identify topics of interest which the user wishes to follow, or individual users or groups of users that the user wishes to follow as well. This information is also stored in data store 20. This can all be done through user interface displays generated by component 22.

Once this is done, and the user wishes to use system 8, the user illustratively logs on to system 8, through an authentication component (which is described in greater detail below), and user interface component 22 generates a user interface display 40 such as that shown in FIG. 3A. In the illustrative user interface display 40, the user's user name is John Doe and that is displayed generally at 42, along with an image 44 which can be selected by John Doe to represent his user name. The display also presents a search box 46, which is a text box that allows the user to enter text (such as by using a keyboard) that represents a search query that the user wishes to have executed. Interface display 40 also illustratively displays the user names or topics that user 42 is following. This is generally indicated at 48. User interface display 40 may also illustratively list other users that are following user 42. This is generally indicated at 50. In addition, user interface display 40 displays a public stream of information 52, which has already been generated. The public stream 52 illustratively includes a plurality of posts 54, corresponding to received topic feeds 70 which will be described in greater detail below. Further, user interface display 40 illustratively includes a set of actuable elements generally shown at 200. By actuable (or actuatable) elements, it is meant that the elements can be actuated through a suitable user interface operation, such as by clicking on an element using a pointing device (like a mouse) or double-clicking or otherwise. These are described in greater detail below as well.

When the interface display 40 is displayed by user interface component 22, the user can enter a desired query into textbox 46. In the example shown in FIG. 3A, the user has typed in "stories about Paul Bunyan". This corresponds to query 60 shown in FIG. 1. The query is sent from user interface component 22 to public search component 10, and specifically to topic feed generator 12. Receipt of query 60 by public search system 10 is illustrated by block 62 in FIG. 2.

Topic feed generator 12, in response to receiving query 60, generates a topic feed that includes query 60 and that is to be output in the public stream 52 as a topic feed 70. Generating the topic feed 70, including the query 60, is indicated by block 72 in FIG. 2.

Feed distributor component 14 then accesses data store 20 to identify the followers of both John Doe (the user that submitted query 60) and the followers of the subject matter content of the query 60, itself. For instance, the subject matter content of query 60 is illustratively "Paul Bunyan". Therefore, if any users have indicated that they wish to follow the topic category (or subject matter category) "Paul Bunyan", then they would be identified by feed distributor component 14 as a recipient of topic feed 70 as well. Feed distributor component 14 then distributes or publishes the topic feed 70 to those recipients that were identified. Identifying recipients is indicated by block 73 in FIG. 2, and distributing the topic feed 70 to the recipients is indicated by block 74 in FIG. 2. It can thus be seen that upon submission of query 60, system 8 automatically publishes that query in a topic feed to all relevant recipients, without any further input from the user.

The distribution or publication can be done in other ways as well. For instance, feed distribution component 14 can wait to update the system of a recipient until the recipient logs on to the system or otherwise engages the system. Similarly, the feed distribution component 14 can wait to distribute topic feed 70 to recipients until after the user has interacted with the results from the query (as described below).

It should be noted that, in FIG. 3A, a wide variety of other embodiments can be used. For instance, public stream 52 may be divided into two streams, one which reflects posts from people that the user is following and the other that reflects posts from topic areas that the user is following. Of course, a wide variety of other changes can be made to the display shown in FIG. 3A, as well.

Once the topic feed 70 has been distributed and published to the identified recipients, a user interface component 22 (corresponding to the recipients) illustratively generates a display for those recipients, such as shown in FIG. 3B. FIG. 3B is similar to that shown in FIG. 3A, except that the user 42 is indicated as Jane Deer. It can be seen from FIG. 3A that Jane Deer is one of the followers of John Doe. Therefore, the topic feed 70 generated from any activity of John Doe will be distributed to, and published at, a user interface component 22 residing at Jane Deer's device.

The topic feed 70 is posted as a post 54 on the public stream 52 of the user interface display shown in FIG. 3B. It can be seen in FIG. 3B that the public stream 52 includes the post "John Doe searched for stories about Paul Bunyan". FIG. 3B shows that both the source of the post and the search which is the subject matter of the post are actuable links, and this is indicated by boxes 90 and 92 in FIG. 3B. Therefore, the term "John Doe" is included in box 90 and the query "stories about Paul Bunyan" is included in box 92. If the user of the system that generated the display in FIG. 3B (that is, Jane Deer) clicks on the text in either box 90 or 92, then the user's system takes action. If the user clicks on box 90, which contains the source of the post, then the user's system links the user to the home page of the person identified in box 90 (John Doe). Therefore, if Jane Deer clicks on box 90 that includes "John Doe", then Jane Deer's system navigates to the home page for John Doe, and presents Jane Deer with a user interface display such as that shown in FIG. 3A. If Jane Deer clicks on box 92, the results for that query will be returned to Jane Deer. This will be described in more detail below.

At the same time that feed distributor component 14 is distributing the topic feed generated by generator 12, search component 16 is also providing query 60 to search engine 26 for execution against corpus 30. Search engine 26 may illustratively be a conventional information retrieval search engine that searches the web for content associated with the query that was input. Search engine 26 can alternatively be implemented in search component 16. Search engine 26 executes the search against corpus 30 and returns search results 80 to search component 16 in public search system 10. Search component 16 then returns results 80 to user interface component 22 corresponding to the author of the query 60 (that is, corresponding to John Doe).

Not only does search component 16 pass query 60 on to search engine 26 for execution against corpus 30, but search component 16 also searches the records stored in data store 20 for any other posts that are relevant to the subject matter of query 60. It may be that John Doe or other users of public search system 10 have submitted similar queries, and therefore topic feeds 70 may have already been generated for those similar queries. Thus, search component 16 searches data store 20 for posts from previously generated topic feeds 70 that are relevant to query 60. These are returned to the user through user interface component 22 as stream results 81. In other embodiments, the records returned from searching data store 20 can be used to re-order search results 80 returned from search engine 26 or a search engine other than search engine 26.

User interface component 22 then generates a display 98 for the user (who submitted the query) such as that shown in FIG. 3C. The display shown in FIG. 3C is similar to that shown in FIG. 3A, and similar items are similarly numbered. However, there are a number of differences. It can be seen that FIG. 3C shows that the search results are presented in two separate categories. The first is stream results section 100 and the second is web results section 102. Under web results section 102, the search results 80 generated by search engine 26 are presented to the user as user actuable links. By way of example, one of results 80 is a URL entitled "Paul and Babe in Bemidji, Minn.". It is shown in a box 103 to indicate that it is actuable on display 98. That is, if the user clicks on one of the results 80, the user will be taken to the web page, or other corpus entry, that spawned that search result.

Under stream results section 100, user interface display 98 lists all posts which contain search results 81 relevant to query 60. That is, if data store 20 included posts that were relevant to the query 60, those posts are also displayed in the stream results 81, along with the web results 80. Again, to the extent that there are any actuable links in stream results 81, posted in stream results section 100, the user can simply click on those actuable links and be taken to the underlying source that spawned the link.

FIG. 3C also shows that system 8 can suggest additional search strategies. This is shown generally at 105.

Sharing Activity

Figure 4A:
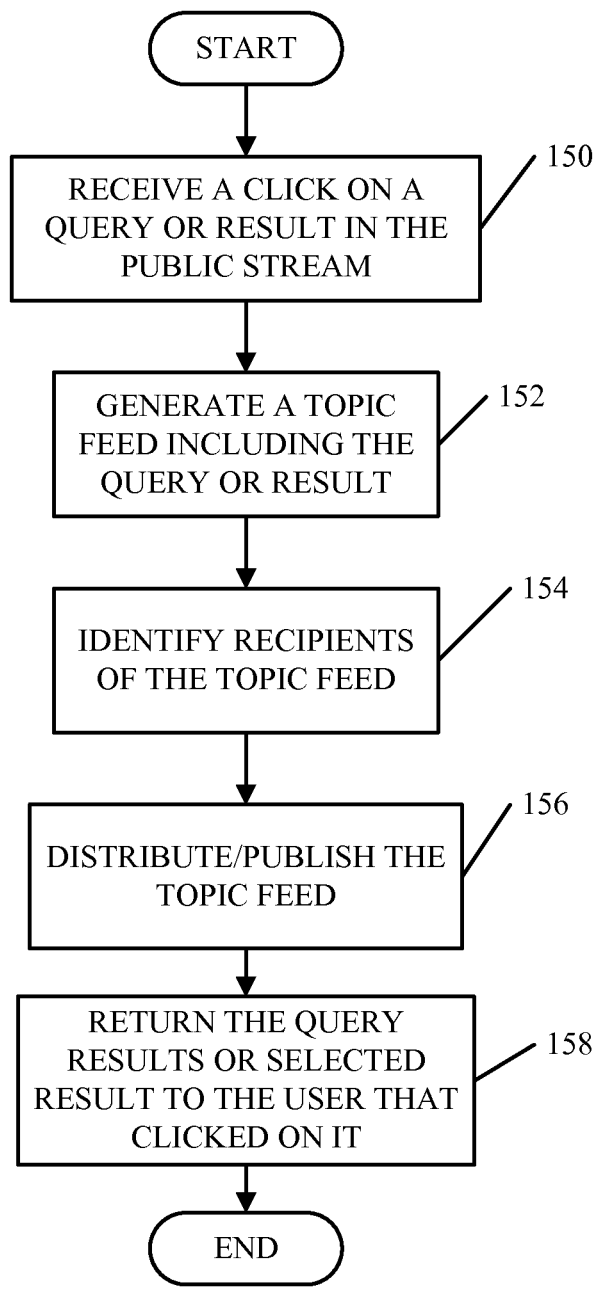
FIG. 4A is a flow diagram showing one embodiment of processing click data.
Figure 4B:
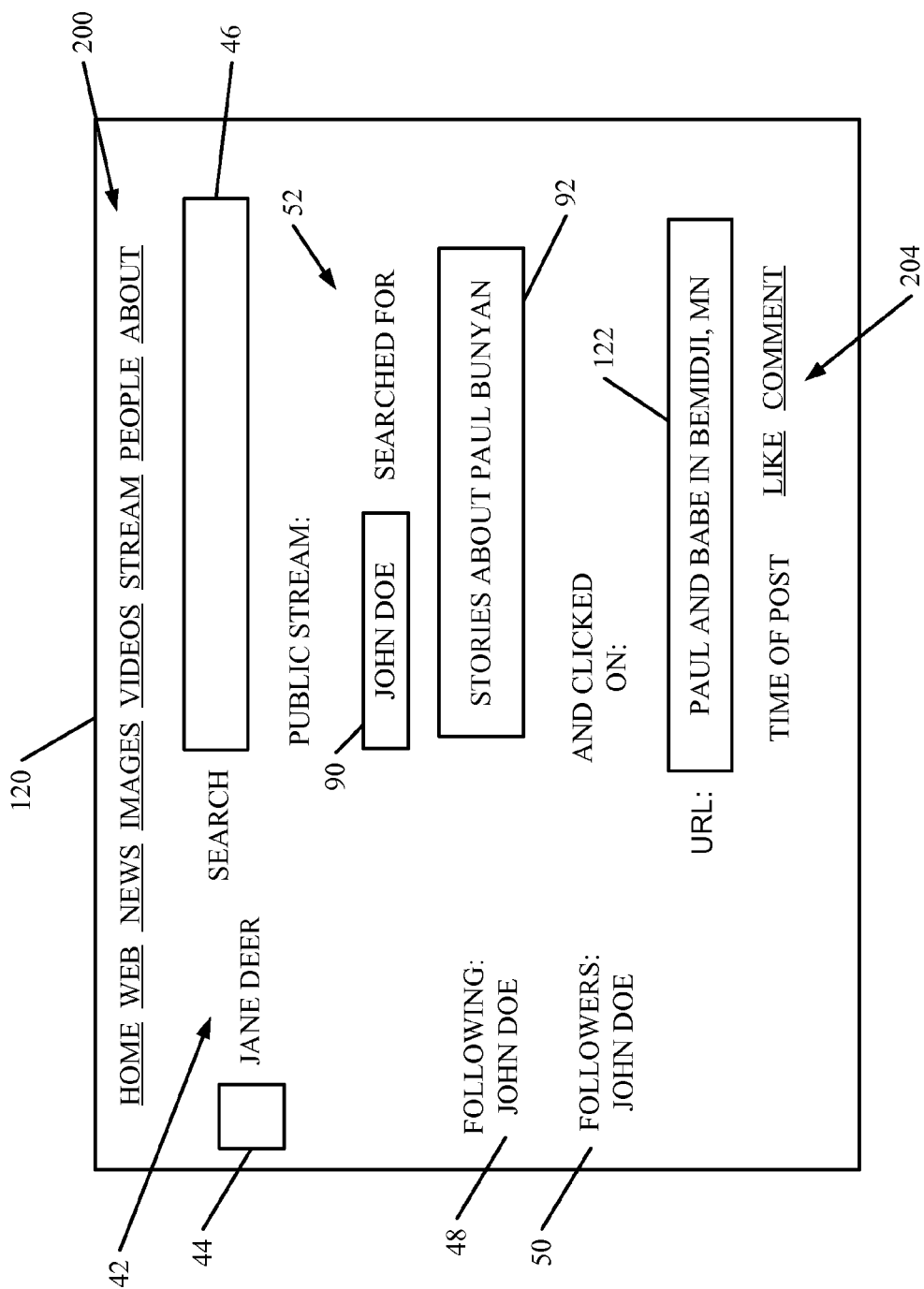
FIGS. 4B and 5 show exemplary embodiments of user interface displays.
Figure 5:
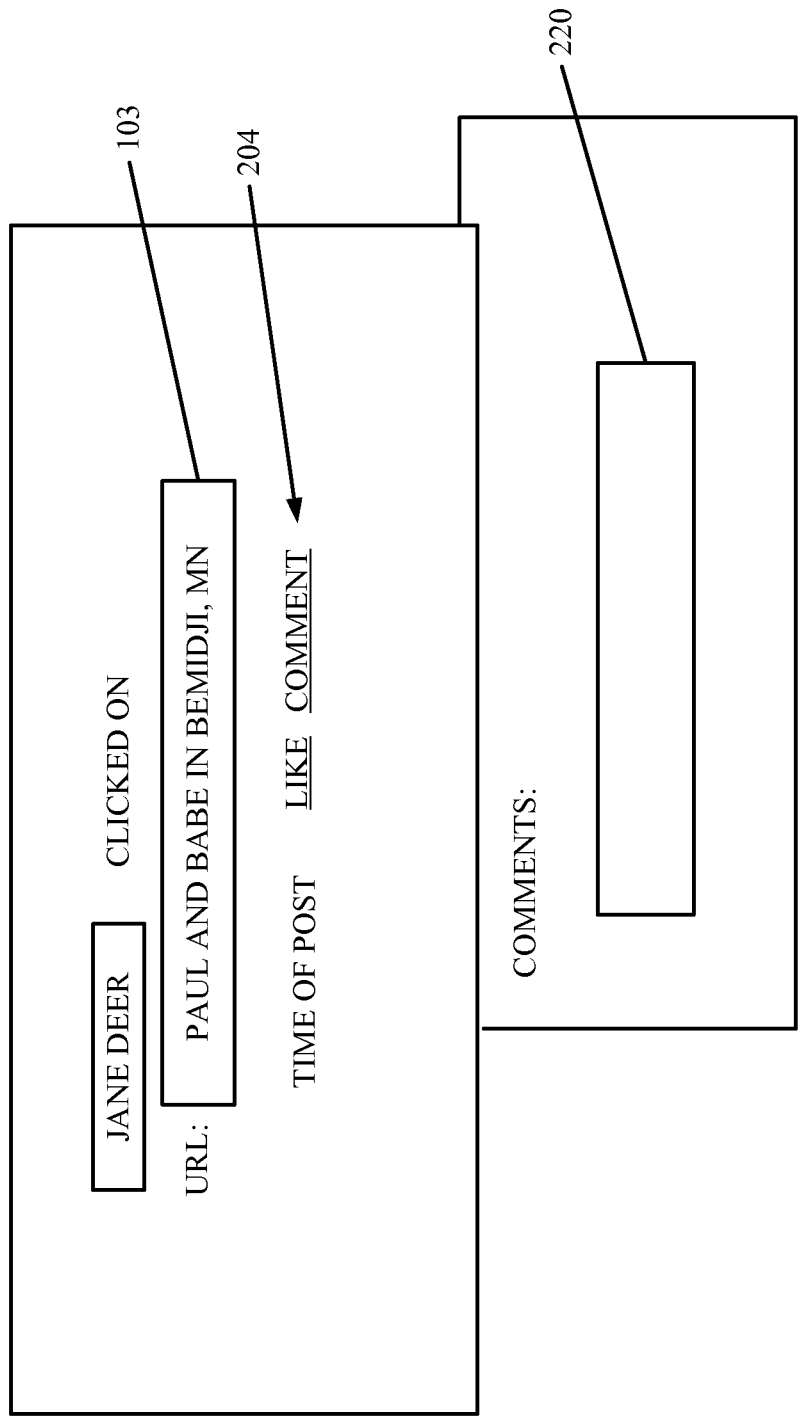

FIGS. 4A-5 illustrate yet another embodiment. In the embodiment shown in FIGS. 4A-5, not only is the public stream 52 filled with topic feeds 70 that contain queries, but it also contains other search activities by users, such as whether the user clicked on one of the results 80 or 81 returned in response to a query 60, or whether the user actuated any of the links in the public stream 52. FIG. 4A is a flow diagram illustrating one embodiment of the operation of the system shown in FIG. 1, where a user (e.g., Jane Deer) that has received topic feed 70 actuates one of the links in one of the posts in topic feed 70.

By way of example, assume that John Doe had clicked on one of the search results, such as result 103, that was presented in response to the query 60. In that case, the user interface display 120 generated at Jane Deer's device is updated to look like that shown in FIG. 4B. That is, it would not only show that John Doe had searched for stories about Paul Bunyan, but it would also indicate that John Doe clicked on (or actuated a link for) one of the search results 103. In the embodiment shown in FIG. 4B, display 120 also shows that the public stream 52 has been updated to indicate that John Doe clicked on the particular URL "Paul and Babe in Bemidji, Minn." that is highlighted by box 122 to indicate that it is also actuable by Jane Deer.

One embodiment of the operation of system 8 in generating this type of post is shown in FIG. 4A. First, FIG. 4A shows that public search system 10 receives either a click on a query or a result that was previously displayed in public stream 52 by user interface component 22. That is, assume that John Doe clicked either on a query in his public stream 52 or (in this case) one of the search results 103 displayed in FIG. 3C. This information is conveyed to public search system 10 as illustrated by block 150 in FIG. 4.

Topic feed generator 12 then generates a topic feed that includes either the query clicked on by John Doe, or, in this case, the result 103 from web results 80 that was clicked on by John Doe. Generating the topic feed, including the actuated result, is indicated by block 152 in FIG. 4A.

Feed distributor component 14 then identifies recipients of the topic feed just generated, and distributes or publishes the topic feed generated in block 152 to those recipients. This is indicated by blocks 154 and 156. Therefore, as shown in FIG. 4B, Jane Deer's user interface display 120 is updated with an additional post to the public stream 52 which shows that not only has John Doe 90 searched for "stories about Paul Bunyan", but he actually clicked on one of the results 80 returned in response to that query, namely a URL entitled "Paul and Babe in Bemidji, Minn." 103, shown in block 122 in user interface display 120.

In response to John Doe clicking on that result, search component 16 and search engine 26 are used to return the document or page that spawned the link in box 122, to John Doe over user interface component 22, for viewing. This is indicated by block 158 in FIG. 4A.

While FIG. 4A has been described with respect to John Doe clicking on one of the search results 80 that was returned in response to the query 60, the same action is taken if any other user clicked on an actuable link in their public stream 52. For instance, if Jane Deer is presented with the user interface display 120 shown in FIG. 4B, Jane Deer can then click on the query "stories about Paul Bunyan" 92 or on the result "Paul and Babe in Bemidji, Minn." shown in box 122, and public search system 10 will generate a topic feed 70 for that activity as well. That is, assuming that Jane Deer has clicked on the query in box 92, topic feed generator 12 will generate a topic feed that includes that query, and feed distributor component 14 will distribute the topic feed to all identified recipients for that topic feed. Similarly, search component 16 and search engine 26 will return the results 80 of the actuated query to the user interface component 22 used by Jane Deer and that will be displayed to John Doe, in a similar fashion to that shown in FIG. 3C (where they were displayed for John Doe) in the first instance.

Similarly, if Jane Deer were to instead click on the result in box 122, then John Doe's user interface display would be updated to show that as well. This is because John Doe is a follower of Jane Deer and would therefore be the recipient of any topic feeds generated by Jane Deer's search activity.

Other Features

User interface displays 3A-3C and 4B show a number of additional features as well. First, the user interface displays include a number of navigation buttons generally indicated at 200. These buttons illustratively include a "home" button, a "web" button, a "news" button, an "images" button, a "videos" button, a "stream" button, a "people" button, and an "about" button. Of course, these are exemplary buttons only and different buttons, additional buttons, or fewer buttons could be used as well. In the embodiment shown, the "home" button takes the user to the user's home page showing the public stream 52 generated using topic feeds 70 that were received by that user. The "web" button takes the user to a web browser and the "news" button takes the user to a news site that displays news that may be relevant to the user. The "images" and "videos" buttons allow a user to easily confine submitted queries to look for either images or videos that are relevant to the search terms in the query, and the "stream" button allows the user to search the user's own public stream 52 for posts relevant to the query. The "people" button allows the user to identify people of interest, that the user may wish to follow. The system can also automatically suggest experts and other people to follow even if the user does not actuate the "people" button. The "about" button describes the functionality of the system.

A number of the user interface displays also include additional features on the bottom of the posts, generally indicated by arrow 204. They include a "time of post" feature, a "like" feature and a "comment" feature. The "time of post" feature simply indicates the time that a post was posted on the user's public stream 52. The "like" button allows the user to indicate that he or she likes the post, and the "comment" button allows the user to comment on the post. This may be done, for instance, by exposing a text box within which the user can comment on the post and have that comment published to other recipients. One embodiment of this is shown in FIG. 5. FIG. 5 shows part of a post that includes the result 103 discussed above. FIG. 5 also shows that, once the user has actuated the "comment" button, a dropdown text box 220 appears, which allows the user to enter a textual comment related to the post 103. The textual comment in box 220 is then distributed to identified recipients.

More Detailed Embodiment

Figure 6:
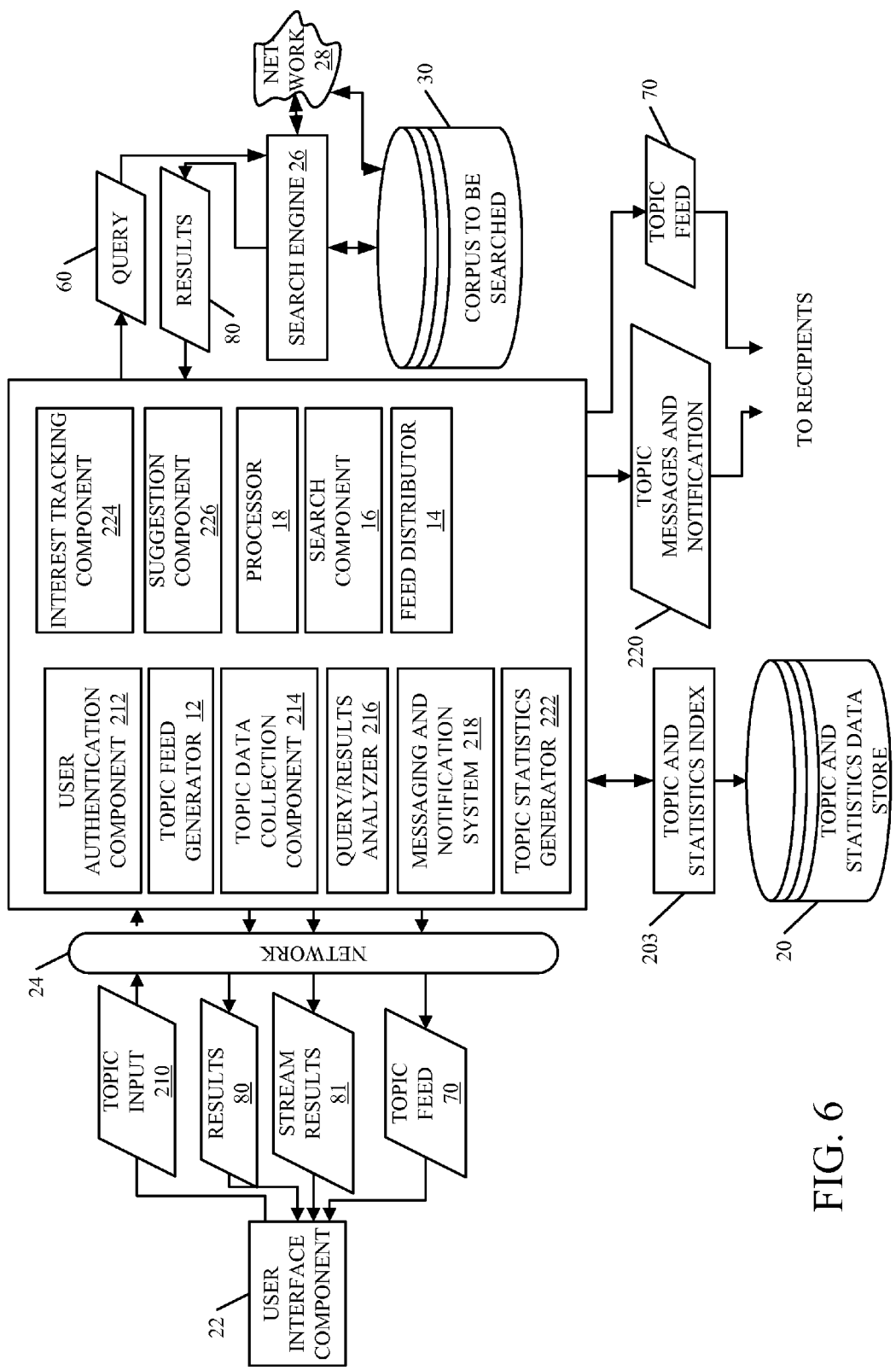
FIG. 6 is a more detailed block diagram of a public search system, in accordance with one embodiment.

FIG. 6 illustrates a more detailed block diagram of system 8, and particularly a more detailed block diagram of one embodiment of public search system 10. Items in FIG. 6 which are similar to those shown in FIG. 1 are similarly numbered. However, FIG. 6 shows that public search system 10 includes a variety of other components as well.

The input from user interface component 22 to public search system 10 is shown not simply as query 60, but as a topic input 210. Topic input 210 can be a query, a click, an administrative input, such as the input of a user name or password to log on to the system, an explicit indication of a topic or person of interest that is to be followed, or a wide variety of other inputs.

Public search system 10 also includes additional components such as user authentication component 212 which is used to authenticate user's logging on to the system. Public search system 10 also includes topic data collection component 214 which collects various items of data (described below) that are stored in data store 20. System 10 also includes query/result analyzer 216 that can be used to both identify the subject matter content of queries and results, and to analyze whether they should more properly be pursued in a private venue.

Messaging and notification system 218, also included in system 10, is used for receiving and transmitting messages among users of system 10, and also for providing notifications to users in system 10. The messages and notifications are indicated by block 220.

System 10 also includes topic statistics generator 222 that generates a variety of statistics which will be described below, as well as interest tracking component 224 and suggestion component 226. Interest tracking component 224 processes the various queries and search results that a user interacts with on system 10 to implicitly determine a user's interests. These are included, along with interests explicitly input by a user, to not only suggest topics or people to follow, but to also suggest changes to search queries that might be input by a user. These suggestions are generated by suggestion component 226.

FIG. 6 also shows that data store 20 has its own index 203. Index 203 indexes the information in data store 20 for ease of searching.

Figure 7:
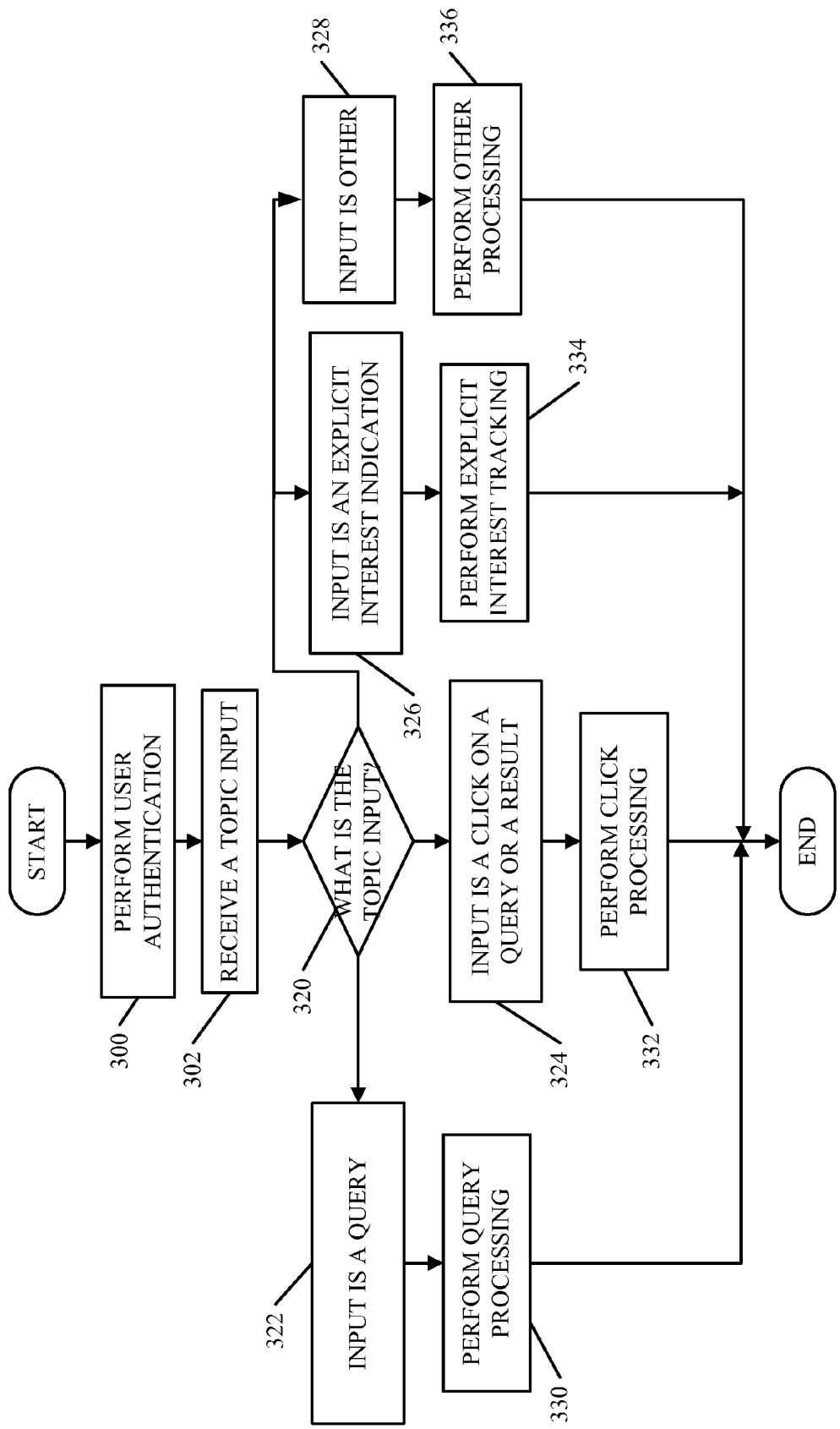
FIG. 7 is a more detailed flow diagram illustrating one embodiment of the operation of the system shown in FIG. 6.

FIG. 7 is a flow diagram illustrating one embodiment of the operation of the system shown in FIG. 6. FIGS. 6 and 7 will be described in conjunction with one another. It should be noted, of course, that the features described in FIGS. 6 and 7 can be in addition to, or instead of, those shown in the previous figures. Also, the particular flow of operation described with respect to FIGS. 6 and 7 is illustrative only. In other words, certain steps could be reversed or performed in different orders. Similarly, the functions of the various components shown in FIG. 6 could either be combined or split even more finely, using other components. Those shown are shown for exemplary purpose only.

During operation, a user first logs on to system 8, through user interface component 22, by illustratively performing some type of user authentication steps. This is managed by user authentication component 212 and indicated by block 300 in FIG. 7. In one embodiment, user authentication simply requires the user to input a user name and associated password. User authentication component 212 then compares the user name and password with profile records stored in data store 20 (or another data store) to determine that the user is entering a valid user name and password. If so, processing continues. If not, the user is prohibited from accessing system 10, until a valid user name and password have been entered. Of course, other authentication components could be used, such as any type of biometric recognition system, voice recognition, etc.

Once user authentication has been performed, the user can provide a topic input 210 to public search system 10. The topic input can be a query, a click on a query, a comment, a click on a query result or a person, an indication that the user likes a particular post, an explicit indication that the user is interested in a given topic or a person, etc. Any type of input which reflects this type of search activity is received by processor 18 and routed to the appropriate components for analysis and processing. Receiving the topic input is indicated by block 302 in FIG. 7.

FIG. 7 shows that there are a number of different possibilities for the topic input 210. For instance, the topic input may be a query, or it may be a click (either on another person's query in a user's public stream, or on a search result that shows up in the user's public stream), it may be an explicit interest indication by the user indicating that the user is specifically interested in a topic area (such as a person or a subject matter area), or it could be another input. This is indicated by blocks 320, 322, 324, 326 and 328 in FIG. 7.

Processing a Query

Figure 8:
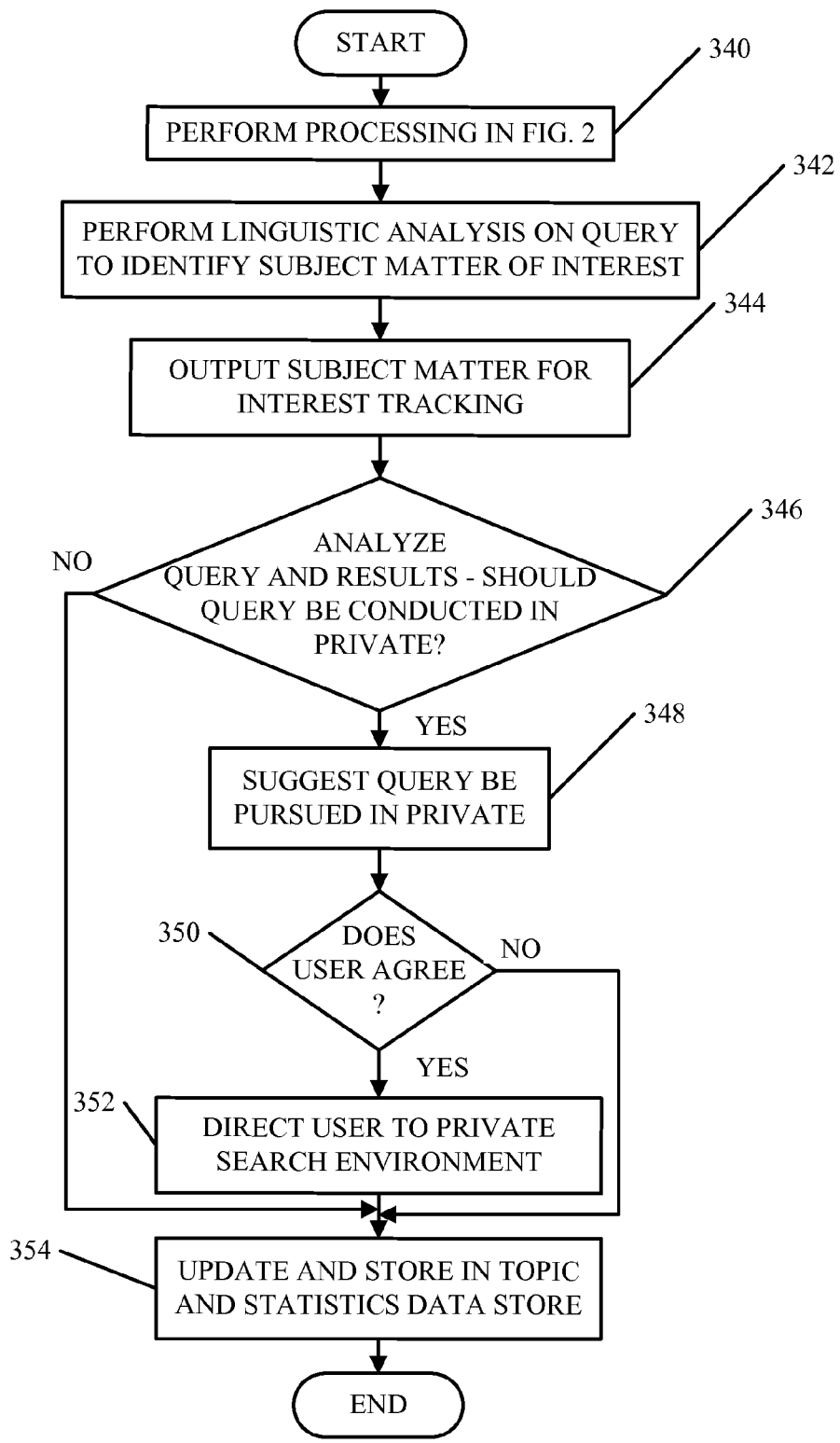
FIG. 8 is a flow diagram illustrating one embodiment for processing a query.

If, at blocks 320 and 322, it is determined that the input is a query, then query processing is performed as shown in FIG. 8. This is indicated by block 330 in FIG. 7.

If the input is a query, such as query 60, then the processing described above with respect to FIG. 2 is performed. This is indicated by block 340 in FIG. 8. That is, a topic feed 70 is generated for the query 60 and recipients of the topic feed are identified and the topic feed 70 is automatically distributed to those recipients. The query 60 is then executed against a data store 30 and against posts in data store 20 and the results 80 and 81 are returned to the user. Embodiments of the user interfaces generated to show this were also described above with respect to FIGS. 3A-5.

However, FIG. 8 shows that, in another embodiment, additional processing can be performed as well. For instance, the query 60 can be provided to query/results analyzer 216 where a linguistic analysis is performed on the query 60 to identify the topics of interest reflected in the query. In one embodiment, keyword recognition is performed on the query to identify keywords, that are associated with topics of interest, that occur in the query. Of course, more advanced natural language processing and statistical analysis can be performed as well, to identify topics of interest. Performing linguistic analysis on the query is indicated by block 342 in FIG. 8.

The topics of interest identified in the linguistic analysis are then output to interest tracking component 224 (shown in FIG. 6). Interest tracking component 224 is described in greater detail below, with respect to FIGS. 11 and 12. Suffice it to say, for now, that interest tracking component 224 receives various items of information based on a user's activity (such as topics of interest reflected in queries or search results that the user has interacted with) and identifies areas of interest for the user based on all the information that the user is generating, or interacting with. Outputting the results of the linguistic analysis to the interest tracking component 224 is indicated by block 344 in FIG. 8.

FIG. 8 also shows that query/result analyzer 216 can perform additional processing as well. For instance, when using public search system 8, a user may forget that the user's queries are actually being published. Therefore, in one embodiment, query/results analyzer 216 analyzes the query, and possibly the query results, to determine whether the query might more appropriately be conducted in private. For instance, the user may not wish the public to know that he or she is looking for a new job. If the user posts a query such as "where can I automatically update my resume?", this may give the user's co-workers, and even supervisors, information that the user does not yet wish to be made public. Of course, there are a variety of other subject matter areas that a user may wish to search, but which the user does not wish to be made public. Therefore, query/results analyzer 216 is illustratively set up to analyze the text of a query, and the text of results, to determine whether they are related to subject matter areas that may best be kept private. This is indicated by block 346 in FIG. 8. If not, then processing simply continues at block 354, which is discussed below.

However, if, at block 346, query/results analyzer 216 determines that the query or results relate to a subject matter area that the user may wish to be kept private, then query/results analyzer 216 provides an output to user interface component 22 that suggests to the user that the query be pursued privately. This can take the form of a cautionary message that is in bold letters, in colored letters, or otherwise. The output may also allow the user to simply click "yes" or "no" to direct the system to a private search forum. Suggesting that the query be pursued privately is indicated by block 348 in FIG. 8.

If the user does not desire that the query be pursued privately, then processing again simply reverts to block 354. However, if, at block 348, it is determined that the user does wish to have the query pursued privately, then processor 18 simply redirects the user to a private search environment, such as by opening a web browser using a private search engine. Determining whether a user wishes to proceed privately and, if so, directing the user to a private search environment, is indicated by blocks 350 and 352 in FIG. 8.

At block 354, data collection component 214 and topic statistics generator 224 collect various items of information from the query (and optionally the results) and generate desired statistics from that information and update and store the topic and statistics data generated, in data store 20. The information is illustratively indexed and the index entries are stored in index 203 as well.

Processing Clicks

Referring again to FIG. 7, if it is determined at block 324 that the topic input 210 is not a query, but is instead a click on a query or a click on a result, then click processing is performed, as indicated at block 332. One embodiment of click processing is described, in more detail, in FIG. 9.

Processor 18 first determines whether the click received as topic input 210 was on another user's query. This is indicated by block 550 in FIG. 9. If the input was a click on another user's query, then system 8 performs query processing as shown in FIG. 8, except that it is performed for the present user (who just clicked on the query) instead of for the user that previously input the query. For instance, if John Doe generates the query "stories about Paul Bunyan" and this is posted to the public stream 52 of Jane Deer, and Jane Deer clicks on that query, then query processing is performed in the same way as if Jane Deer had input the query originally, except that topic data collection component 214 and topic statistics generator 222 generate information and statistics for Jane Deer that show that she clicked on someone else's query, instead of input it herself. Analyzing the text of the query and returning results, etc., is performed in the same way as shown in FIG. 8. This is indicated by block 552 in FIG. 9.

If, at block 550, it is determined that the click was not on another's query, then processor 18 determines whether the click was on a search result input by another. This is indicated by block 554 in FIG. 9. If so, then system 8 performs the same processing as shown in FIG. 4A, for a click on a result. This is indicated by block 556 in FIG. 9.

Figure 9:
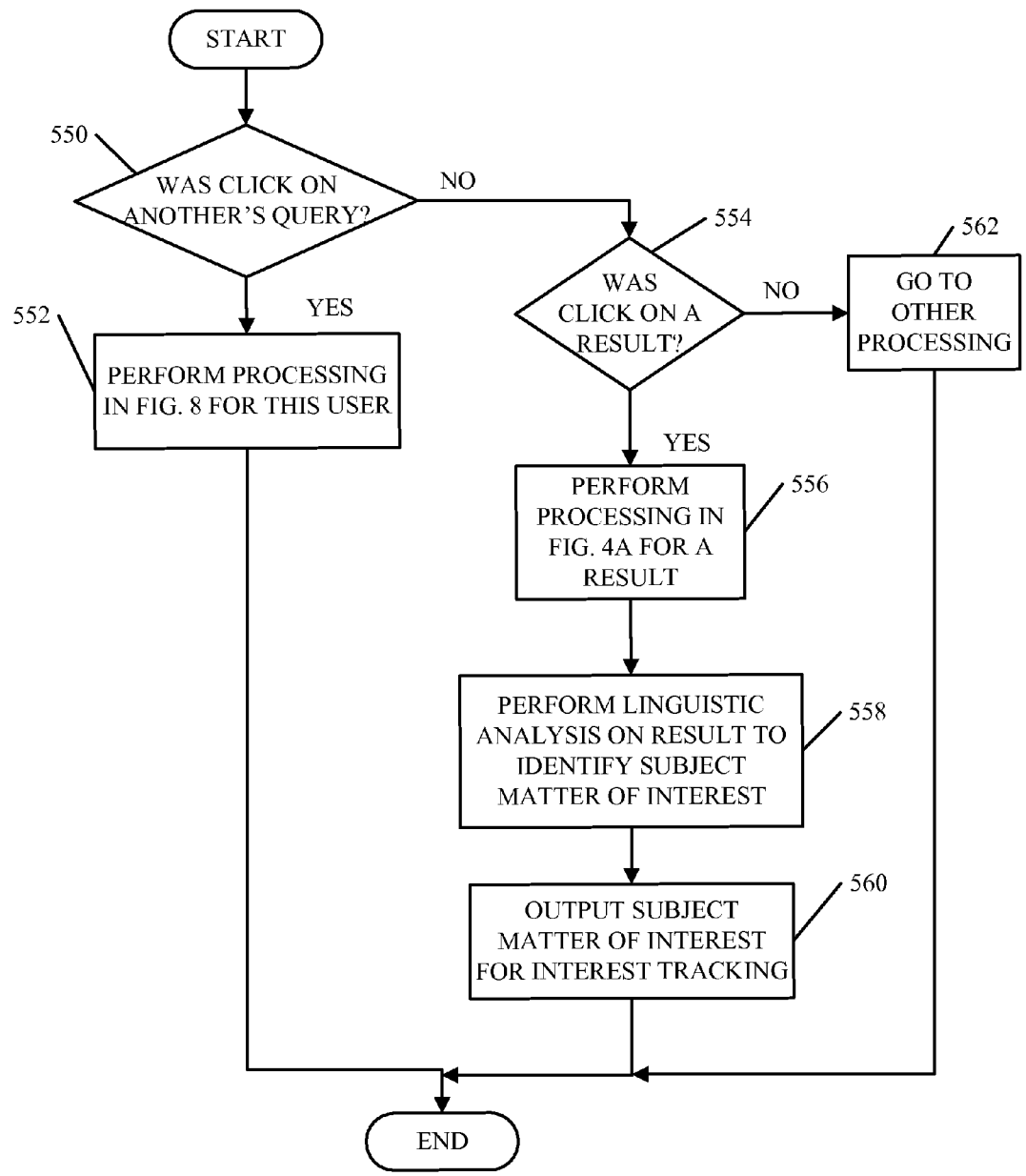
FIG. 9 is a more detailed flow diagram showing one embodiment for processing click data.

FIG. 9 also shows that system 8 can illustratively perform additional processing, based on clicks, as well. It is not only queries input by users that indicate the interests of the users, but the results that the user interacts with (e.g., clicks on) also indicate the interests of a given user. Therefore, query/results analyzer 216 can perform linguistic analysis on the text of a result that was clicked on to identify the subject matter corresponding to that result. This is indicated by block 558. Those subject matter areas are output to interest tracking component 224 to assist in tracking the interests of the present user. This is indicated by block 560 in FIG. 9. The operation of interest tracking component 224 is discussed in greater detail below with respect to FIGS. 10 and 11.

If, at block 554, it is determined that the click was on some other portion of the user interface display, then processing proceeds with respect to block 328 in FIG. 7. This is indicated by block 562 in FIG. 9.

Processing Other Inputs

Figure 12:
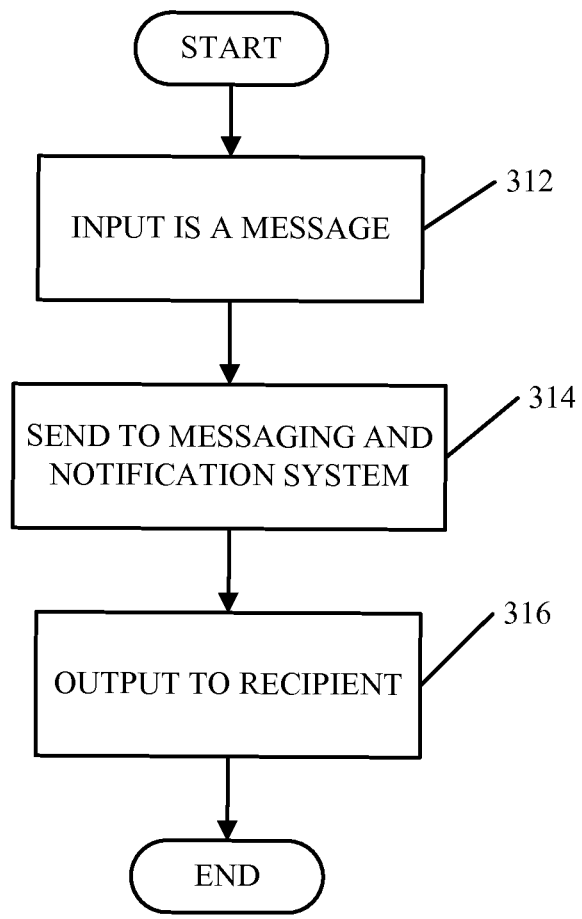
FIG. 12 illustrates one embodiment for processing a message input.

Referring again to FIG. 7, if, at block 320, it is determined that the input 210 is some other type of input, the appropriate action is simply taken, as indicated by block 336 in FIG. 7. For instance, FIG. 12 shows a flow diagram illustrating the operation of system 8 when the input 210 is a message. In that case, the message is sent to messaging and notification system 218 and output to the desired recipient. This is indicated by blocks 312, 314 and 316.

Appropriate processing is performed for any other input 210 as well. For instance, if the user clicks on the "comment" button and inputs a textual comment, then processor 18 controls system 8 to receive the textual input, as the comment, through user interface component 22 and identify recipients that are to receive it and then distribute it to those recipients.

It should also be noted that system 8 can include other things as well. For instance, though the description has proceeded with respect to system 8 receiving mouse clicks, textual inputs, etc., other input and output modes could also be used. User interface component 22 can receive speech input from the user and perform speech recognition, and system 8 can be controlled in that way as well. Alternatively, the speech recognition can be performed in public search system 10. Similarly, user interface component 22 can include text synthesis components that synthesize text into speech and communicate audibly with the user. A wide variety of other changes can also be made to the system.

Data Store 20

Figure 8A:
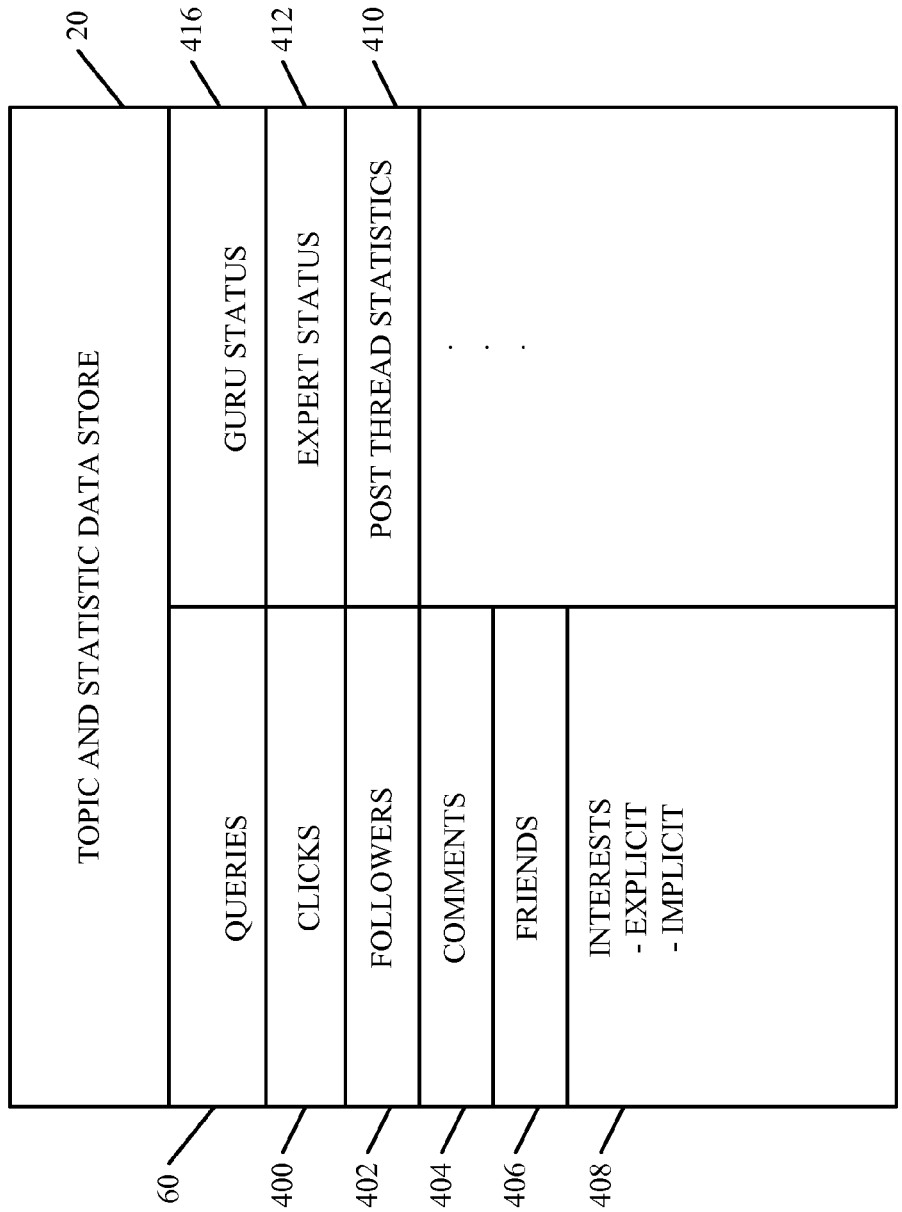
FIG. 8A illustrates one embodiment of information stored in a topic and statistics data store.

FIG. 8A illustrates one embodiment of a number of different items of information that can be stored in topic and statistics data store 20. Of course, the items of information shown in FIG. 8A are all related to an individual user. Therefore, it can be seen that data store 20 illustratively stores all of the queries 60 input by a given user, the clicks on other person's queries and clicks on search results as indicated by 400 in FIG. 8A, all of a user's followers 402, all of the comments 404 posted by the user, any friends 406 of the user (if friends are separately designated from followers) the user's interests, both explicitly indicated by the user, and implicitly derived by interest tracking component 224, as indicated by block 408 in FIG. 8A, post thread statistics associated with posts that were generated by the user, and the user's status. This is indicated by block 410 in FIG. 8A. Data store 20 also indicates a user's status as an expert or a guru as indicated by blocks 412 and 416 in FIG. 8A. Data store 20 is shown for exemplary purposes only and other types of data can be stored as well.

Post Thread Statistics

Topic statistics generator 222 illustratively generates post thread statistics which indicate the number of times that the user's posts have been interacted with (such as clicked on or re-posted) by others. For instance, if John Doe submits a query 60 which is posted to the public stream 52 of his followers, and one of the followers (such as Jane Deer) clicks on the query 60, then the query will also be posted on the public stream 52 of all of the followers of Jane Deer. Thread statistics 410, which are generated by topic statistics generator 222, track how many times the user's posts have been posted and re-posted in system 8.

Figure 8B:
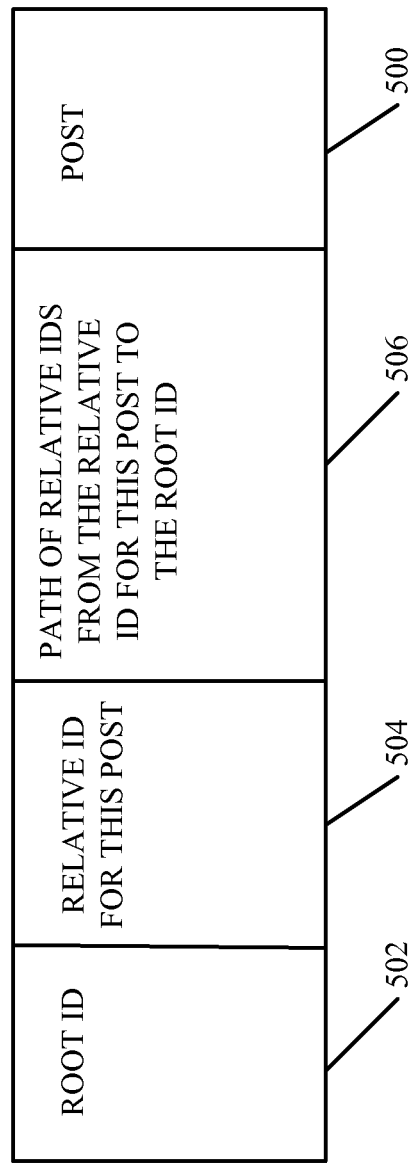
FIG. 8B illustrates one embodiment of information items contained in an exemplary record for a post

In order to do this, each of the queries (or posts) is stored in data store 20, in one exemplary embodiment, according to a data structure such as that shown in FIG. 8B. It can be seen that the post itself, 500, has an associated root identifier (ID) 502, a relative identifier (ID) 504, and a path if relative identifiers (IDs) 506. The root identifier (ID) 502 for the post is a unique identifier associated with the author, or originator, of the post. In the example being discussed, the root (ID) 502 is that associated with John Doe.

The relative ID for this post 504 is associated with someone downstream of John Doe who re-posted John Doe's original post. In the example being discussed, the relative ID 504 corresponds to Jane Deer. The path of relative IDs 506 extends from the relative ID (the most recent poster) for this post to the root ID 502. For instance, assume that Jane Deer's relative ID is 14. Then the path of relative ID's 506 is 14, 1. If one of Jane Deer's followers then re-posts the query, the root ID for the re-posted query stays the same (1), the relative ID belongs to the follower of Jane Deer (say the relative ID for that follower is 28) and the path of relative ID's is 28, 14, 1. In this way, statistics generator 224 not only keeps track of who originated the posts, but it keeps track of the number times the post has been re-posted. It also keeps track of the path of followers through which the post traveled.

These types of post thread statistics are of interest for a number of reasons. For instance, on some social networking sites, when a post of an individual is widely disseminated, it is referred to as "going viral." There can be some prestige associated with a post that has gone viral. However, it can be difficult to identify the originator of the post. Therefore, using statistics generator 222 and the data structure shown in FIG. 8B (or some similar data structure) system 8 can easily track the originator of viral posts, and give the originator credit for the post threads.

Expert and Guru Status

Expert status 412 and guru status 416 are illustratively assigned to user's that are widely followed in a given topic area. For instance, if John Doe is widely followed in the topic area of "Paul Bunyan" and, in fact, has a sufficient number of followers, then John Doe may be awarded the expert status 412 in the topic area of Paul Bunyan. If John Doe happens to be the most followed user in that subject matter area, then John Doe is illustratively awarded the most followed (e.g., guru) status 416. This is indicated in data store 20 as well.

Particular ways in which expert status 412 and guru status 416 are conveyed can vary widely. As discussed above they may simply have to do with the number of followers a given user has on a given subject. Of course, they may also be determined based on the post thread statistics (the number of posts or re-posts attributed to that user) on that given topic or subject matter area. Other techniques can be used as well, in order to recognize someone as an expert or guru. For instance, a community of users can vote on that status by entering appropriate inputs on interface 22, or the status can be awarded in other ways as well.

In any case, data collection component 214 and topic statistics generator 222 can illustratively collect or generate the information necessary to award any desired status (for a topic or subject matter area) to one or more users, based on popularity, or other statistics.

Interest Tracking

Figure 10:
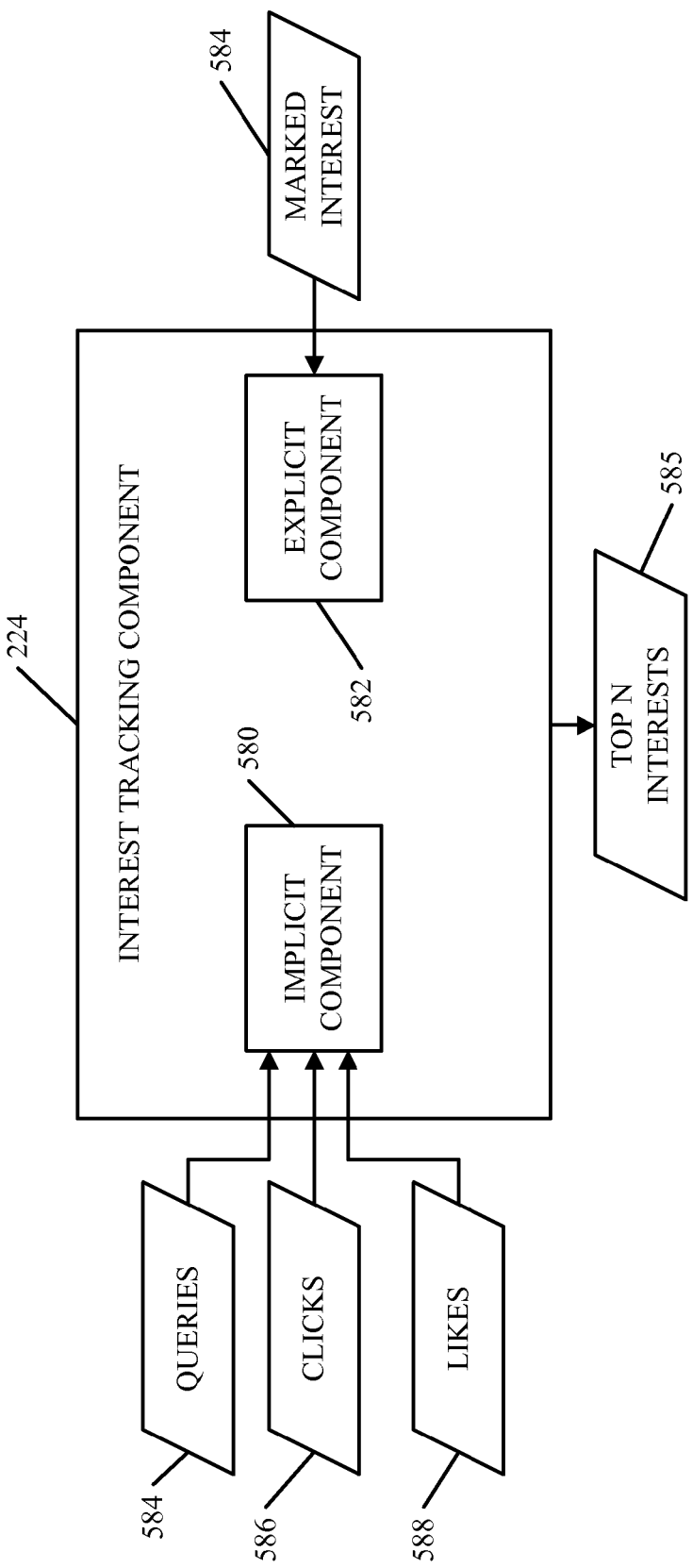
FIG. 10 is a simplified block diagram of an interest tracking component, in accordance with one embodiment.
Figure 11:
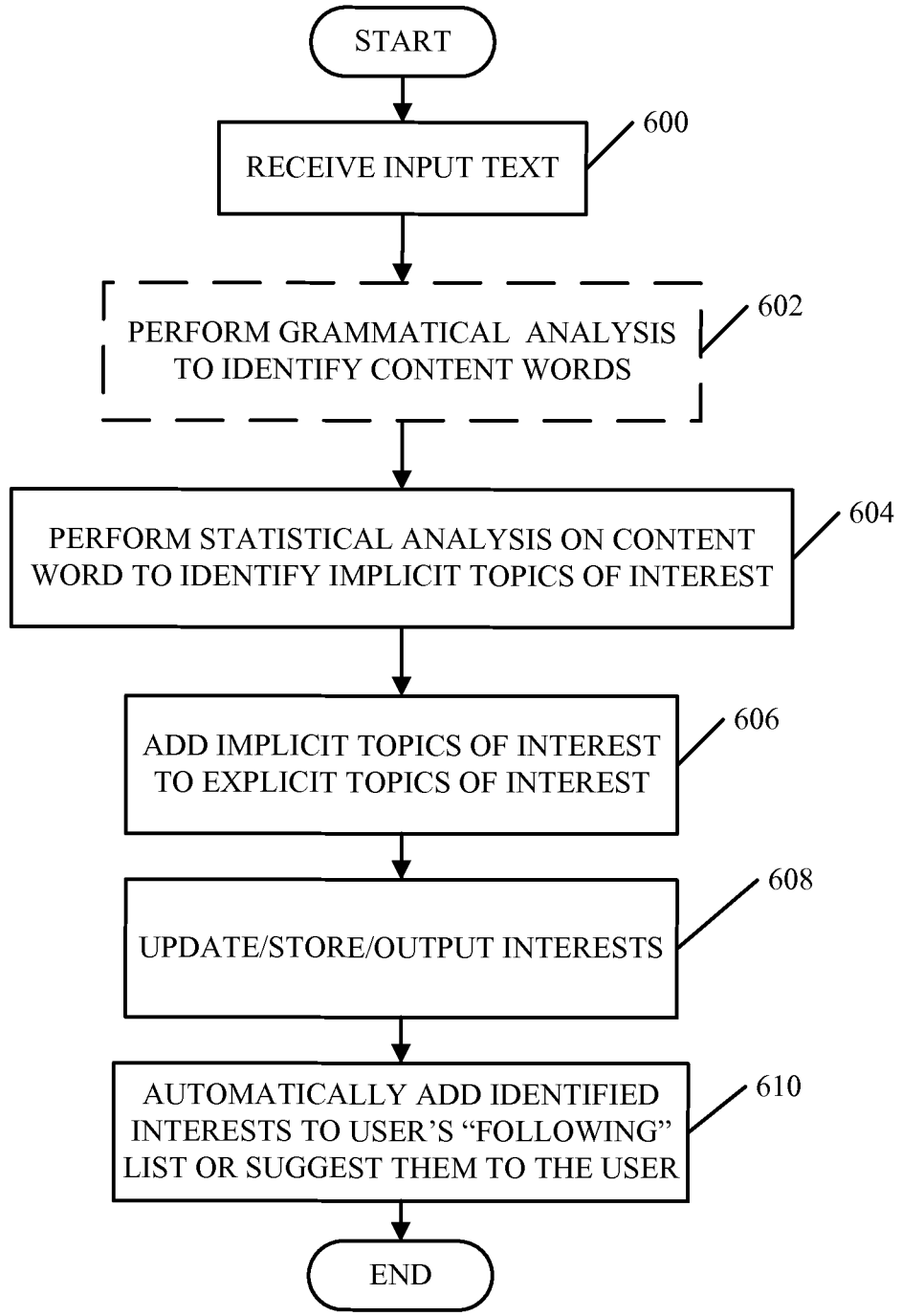
FIG. 11 is a simplified flow diagram illustrating one embodiment of the operation of the interest tracking component shown in FIG. 10.

To discuss interest tracking reference is again made to FIG. 7. Recall that a user can provide an input that explicitly identifies that the user is interested in something or someone. This is referred to as an explicit interest indication. If, at block 320, it is determined that the input 210 is an explicit interest indication (shown at block 326) then explicit interest tracking is performed as indicated by block 334. FIG. 10 shows a simplified block diagram of one embodiment of interest tracking component 224, and FIG. 11 shows one embodiment of its operation. FIG. 10 shows that interest tracking component 224 includes an implicit interest tracking component 580 and an explicit interest tracking component 582. Explicit interest tracking is discussed below, while the operation of implicit tracking component 580 is described first.

As briefly discussed above with respect to FIG. 6, interest tracking component 224 receives a variety of information and operates on that information to implicitly identify interests of a given user. By implicitly identifying interests, it is meant that the user has not made an explicit interest indication indicating that the user is interested in a certain subject matter area or person but instead component 518 implicitly derives that information based on analysis of a user's activity.

For instance, a user may explicitly indicate that he or she is interested in a topic by providing an appropriate input through user interface component 222. However, implicit interest tracking component 580 takes other inputs by the user and analyzes them to implicitly define the interests of the user. The information shown in FIG. 10, that is considered by component 518, is exemplary only, and other or different information can be used as well. However, the exemplary information shown in FIG. 10 includes textual information from queries 584, textual information derived from posts that the user has clicked on 586, and textual information from subject matter that the user has "liked" or indicated a preference for 588. The textual information from queries 584 can be the results of a grammatical analysis performed on the queries posted by the user, and may include (by way of example) keywords or predefined topics or people of interest to which the queries relate. Similarly, the information from clicks 586 can be grammatical information derived from queries that have been clicked on by the user, or results that have been clicked on by the user. In addition, the information from likes 588 can be generated from posts which the user has "liked" as discussed above with respect to FIGS. 3A-5. Alternatively, of course, tracking component 224 can receive the raw text from those sources and submit it to query/results analyzer 216 (or another component) for grammatical analysis as well. This is indicated by optional block 602 in FIG. 11.

Once implicit interest tracking component 580 receives grammatically analyzed text (as indicated by blocks 600 and 602 in FIG. 11), it, or another component, illustratively performs statistical analysis on content words of that text to identify implicit topics of interest. This is indicated by block 604. For instance, if implicit interest tracking component 580 simply receives a set of keywords that have been grammatically extracted from the textual sources, then implicit interest tracking component 580 illustratively counts and stores the frequency of occurrence of those words in the textual inputs. By identifying the content words that are most used or interacted with by a given user, implicit interest tracking component 580 can map those words to topics of interest that are recognized in system 8, or it can generate new topics of interest. For instance, if keywords that correspond to a particular subject matter (such as the words "Paul Bunyan") are frequently used, implicit component 518 can identify "Paul Bunyan" as a particular subject matter area of interest for the user In addition, if the analyzed text includes the name of another user (with sufficient frequency) then that user may be identified as an interest of the current user. Similarly because data store 20 stores data that identifies other users that have similar interests to the present user, interest tracking component 224 can implicitly identify those other users as possible people for the current user to "follow". Performing the statistical analysis on the content words and other users is indicated by block 604. The same type of analysis can be performed on topics of interest (as opposed to content words) if the topics of interest are provided instead of just the content words.

Interest tracking component 224 also includes explicit interest tracking component 582. In one illustrative embodiment, a user can input an explicit interest indication by marking certain textual items, explicitly, as being items of interest to the user. For instance, the user can use the # tag before, or after, or surrounding, textual words to explicitly indicate that the user is interested in topics that correspond to those words.

This can also be used to remove certain textual items from the implicit interest tracking analysis. For instance, if the user inputs a query which includes the term "White House", the user may be referring to president's residence in Washington D.C., or to houses that are white in color, generally. If the text is not explicitly marked by the user, then implicit interest tracking component 580 may either analyze the text and believe that the user is interested in the president's residence, or in white houses in general. However, if the user explicitly marks the text as follows "#white# #house#" then the term "White House" will be removed from the implicit tracking analysis performed by component 580, and the terms "white" and "house" will be input as specifically, and explicitly, marked interests 584 to explicit component 582. Explicit component 582 can correlate the marked interest 584 to already defined topics of interest, or it can use that information to define a new topic of interest that the user can follow.

After it has received the textual inputs and performed the linguistic and statistical processing, interest tracking component 224 generates a list of the top N interests 585 which have been derived for the given user. The top N interests will, of course, include all of those interests which have been explicitly indicated by the user. However, they may also include a number of topics of interest that have been implicitly derived by component 580. The number, N, of topics of interest that are output and stored for a given user can be empirically set, or it can be chosen by the user, or it can simply be selected at random or any other way. For instance, in one embodiment, interest tracking component 224 keeps track of the top 50 topics of interest for a given user, whether they are implicitly derived or explicitly input.

Once all the inputs have been analyzed, interest tracking component 224 combines the implicit topics of interest with the explicit topics of interest, as indicated by block 606, and updates data store 20 to indicate the new or revised topics of interest, and also outputs them for review by the user. This illustratively includes a separate list of other users who share the same topics of interest. This is indicated by block 608. Interest tracking component 224 can do this in a number of different ways. For instance, interest tracking component 224 can automatically update the "Following" list on the user's home page to include any newly identified topics of interest (subject matter areas or people), and to delete old topics of interest, which no longer fall within the top N topics of interest 585 output by component 224. In this way, system 8 will automatically begin posting new posts to the public stream 52 of the user, to reflect the new implicitly derived and explicitly indicated topics of interest. Of course, the user may not wish the system to automatically update his or her topics of interest in the "Following" list. Therefore, alternatively, interest tracking component 224 may simply provide an output that indicates to the user that certain changes in the user's topic of interest are suggested, and allow the user to accept or reject those changes, either individually, or as a group. This is indicated by block 610 in FIG. 11. Component 224 illustratively keeps updating the top N list 585 as the user uses system 8. In this way, the user can easily ensure that the public stream 52 contains posts that are of current interest to the user.

Enterprise Search

It should be noted that while system 10 is described above as being completely public, it can also be public within a given context. For instance, system 10 can be deployed behind a firewall so only potential recipients that also reside behind the firewall will receive topic feed 70. This allows those in, for example, an organization to share search activity but keep that information behind the firewall. Thus, employees of a company can collaborate and have frank discussions and conduct shared search activity about competitors without providing the competitors with access to sensitive information. System 10 can also be deployed on even a smaller scale, such as within a work group.

Illustrative Computing Environment

Figure 13:
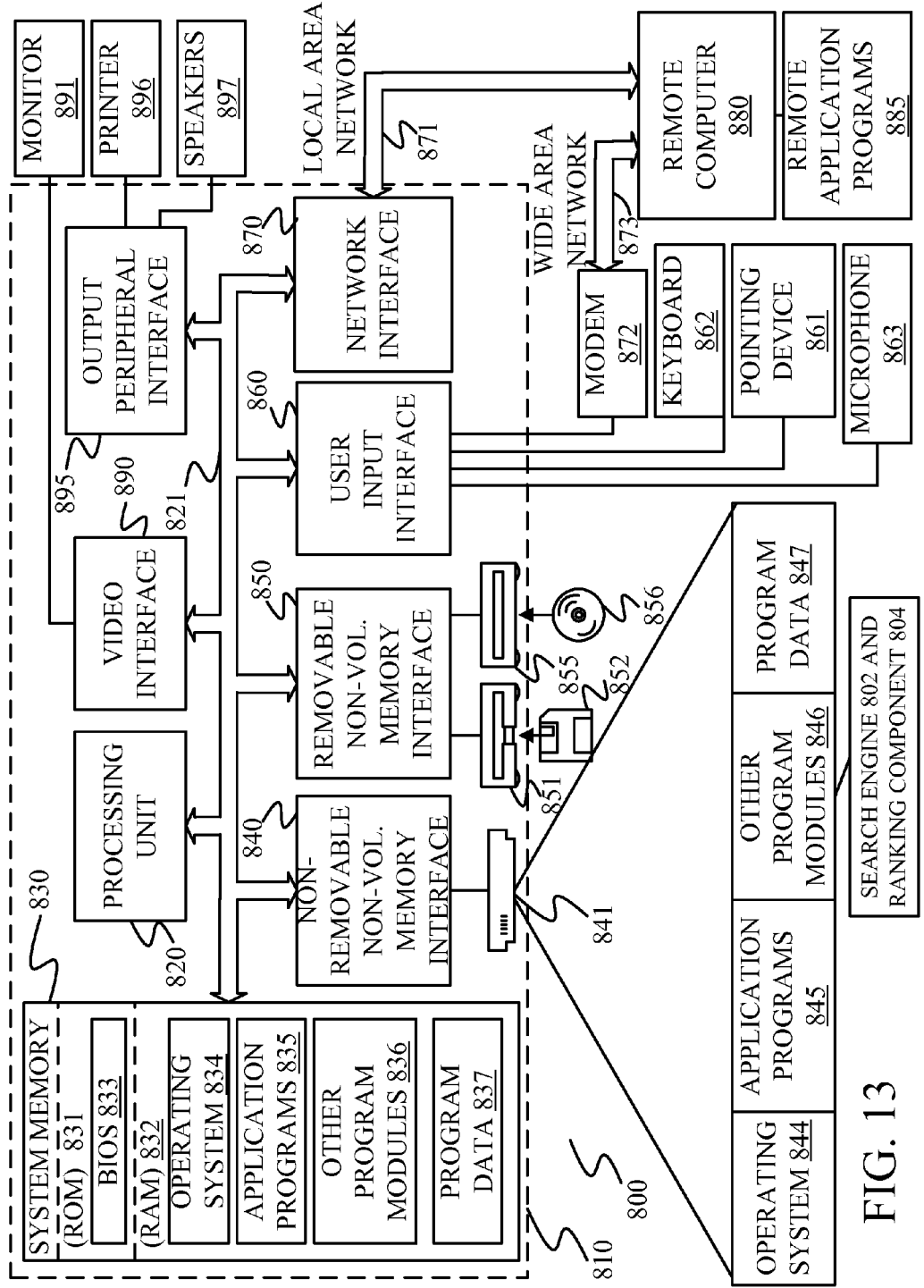
FIG. 13 is a block diagram of one illustrative computing environment in which the public search system can be implemented.

FIG. 13 shows one illustrative computing environment where system 8 can be employed. The computing environment can be employed as public search system 10, user interface component 22, or both. Similarly, those components can be deployed on other type of computing devices, such as handheld devices, mobile devices, laptop devices, cellular telephones, personal digital assistants (PDA), etc.

With reference to FIG. 13, an exemplary system for implementing some embodiments includes a general-purpose computing device in the form of a computer 810. Components of computer 810 may include, but are not limited to, a processing unit 820 (which can act as processor 18) a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically, but not always, includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media (which is not included in computer storage media) typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 155 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 can be operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet. Computer 810 can be used in many different applications. For instance, by way of example, and without limitation, it can be used for general purpose computing, data communication applications, in avionics, military applications or electronics, or shipping electronics. Of course, computer 810, or portions thereof, can be used in many other applications as well.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

Computer 810 may also act as one of the servers or server computers discussed with respect to FIG. 13. Also, it should be noted that many of the components shown in FIG. 13 can be fully implemented in silicon, or partially implemented in silicon. The particular configuration shown in FIG. 13 is exemplary only. The embodiments described above in FIGS. 1-12 can also be implemented by the processor and using memory and other components in FIG. 13.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of identifying user interests, using a computer processor, comprising:
    receiving text from a shared topic feed distributed to the computer processor, the shared topic feed comprising at least one search query entered by a user in a public stream and a link associated with the search query, and wherein the shared topic feed further includes search results returned for the query submitted by the user along with a link corresponding to each of the search results;
    receiving an indication that the user has interacted with a portion of the received text, including receiving an indication that the user has submitted the query entered by the user for execution by a search engine;
    receiving marked text marked with an explicit interest indication that the user is interested in a subject matter or a person identified in the marked text;
    identifying content words in the portion of the received text;
    removing the marked text from the content words;
    performing a statistical analysis on the content words, with the marked text removed, to identify the user interests, wherein the user interests include a topic of interest that includes at least one of a subject matter of interest and a person of interest;
    identifying the user interests based on the explicit interest indication and the statistical analysis; and
    displaying an indication to the user indicative of the identified user interests.

2. The computer-implemented method of claim 1 wherein identifying content words in the portion of the received text comprises identifying content words in the search query submitted by the user.

3. The computer-implemented method of claim 1 wherein receiving an indication that the user has interacted with the portion of the received text comprises:
    receiving an indication that the user has selected at least one of the search results.

4. The computer-implemented method of claim 3 wherein identifying content words in the portion of the received text comprises identifying content words in the selected search result.

5. The computer-implemented method of claim 1 wherein the search query in the shared topic feed comprises a query submitted by a third party, and wherein receiving an indication that the user has interacted with the portion of received text comprises:
    receiving an indication that the user has actuated the link associated with the query.

6. The computer-implemented method of claim 1 wherein the shared topic feed comprises a plurality of different posts, and further comprising:
    providing, in the topic feed, a user input mechanism by which the user can comment on the plurality of posts in the shared topic feed, and wherein receiving an indication that the user has interacted with the portion of received text comprises receiving an indication that the user has commented on one of the posts, such that, the portion of text comprises text in the post on which the user commented.

7. The computer-implemented method of claim 1 wherein the shared topic feed comprises a plurality of different posts, and further comprising:
    providing, in the shared topic feed, a user input mechanism by which the user can like individual ones of the plurality of posts in the shared topic feed, and wherein receiving an indication that the user has interacted with the portion of received text comprises receiving an indication that the user has liked one of the posts, such that, the portion of text comprises text in the post which the user liked.

8. The computer-implemented method of claim 1 wherein the shared topic feed comprises a plurality of posts, each post including a user identifier identifying a user that contributed to the post, along with a link corresponding to the user identifier, and wherein receiving an indication that the user has interacted with the portion of received text comprises:
    receiving an indication that the user has actuated the actuable link corresponding to the user identifier such that the portion of the received text comprises text in the user identifier.

9. The computer-implemented method of claim 1 wherein identifying content words comprises:
    performing linguistic analysis on the portion of the received text to identify the content words.

10. The computer-implemented method of claim 1 wherein identifying the user interests based on the content words identified comprises:
    performing the statistical analysis to identify a frequency of occurrence of the content words in text with which the user has interacted.

11. The computer-implemented method of claim 1 wherein identifying the user interests based on the content words identified comprises:
    identifying the user interests from a list of predefined topics of interest based on the statistical analysis, wherein the predefined topics of interest include people of interest and subject matter areas of interest.

12. The computer-implemented method of claim 1 wherein identifying the user interests based on the content words identified comprises:

identifying the user interests and generating a new topic of interest, corresponding to the identified user interests, based on the statistical analysis, wherein the new topic of interest includes one of a subject matter area of interest or a person of interest.

13. The computer-implemented method of claim 1 wherein the user can specify sources of the topic feed by specifying subject matter of posts to be received and people from whom posts are to be received, and further comprising:

receiving an input from the user indicating that the user wishes to receive posts in the shared topic feed from people, and about subject matter, in the topic of interest; and including, in subsequent shared topic feed posts distributed to the computer processor, posts from the people, and about the subject matter, in the topic of interest.

14. The computer-implemented method of claim 1 and further comprising:

including, in subsequent shared topic feed posts distributed to the computer processor, posts from the people, and about the subject matter, in the marked text.

15. A computer implementing public search system, comprising:

a topic feed generator that receives input queries and generates a topic feed including posts of the input queries;

a feed distributor that distributes the topic feed to recipients;

a user interface component that displays the topic feed and receives user inputs indicative of a user interacting with text in the topic feed;

an interest tracking component that identifies topics of interest based on the text that the user interacted with in the topic feed, the feed distributor including in the topic feed displayed at the user interface component, posts corresponding to the identified topics of interest, the interest tracking component including an explicit component that identifies the topics of interest in text that is explicitly marked as of interest, and an implicit component that performs linguistic and statistical analysis on remaining text, with the explicitly marked text removed, that the user interacted with in the topic feed to identify the topics of interest; and a processor that is a functional component of the system and is activated by the topic feed generator and the interest tracking component to facilitate generating the topic feed and identifying topics of interest.

\* \* \* \* \*